United States Patent Office 3,150,111
Patented Sept. 22, 1964

3,150,111
REACTION PRODUCTS OF EPOXIDIZED OILS WITH SILICON TETRACHLORIDE
Derick Fysh, Stratford, London, England, assignor to A. Boake Roberts & Company Limited, London, England
No Drawing. Filed May 6, 1959, Ser. No. 811,285
Claims priority, application Great Britain, May 8, 1958, 14,796
10 Claims. (Cl. 260—22)

The present invention relates to new compounds containing silicon in the molecule and useful as intermediates in the production of paints, printing inks and synthetic resins with special properties.

According to the present invention a process for the production of new compositions of matter comprises reacting a silicon tetrahalide with an epoxide as hereinafter specified.

The epoxide reaction component is a substance produced in known manner by epoxidizing an unsaturated alcohol or an ester of an unsaturated fatty acid, for example, by reaction of the ester with hydrogen peroxide in the presence of formic or acetic acids whereby epoxide groups are formed across double bonds of the unsaturated ester. The unsaturated ester is one having an iodine value which should not be less than about 80 and should not contain any substantial proportion of conjugated double bonds. It is generally assumed that all compounds containing epoxy groups will act in an equivalent manner in reactions concerning the epoxide groups but, while this may be so, the compounds produced and the yields obtained will vary very considerably according to the nature of the unsaturated compound, i.e., whether it is derived from an epoxidized ester of an unsaturated fatty acid and whether the said ester contains conjugated unsaturation and further whether the epoxy compound is derived from an olefine or resinous condensation products of ethylene oxide derivatives with phenols. For the purpose of the present invention therefore the epoxide reaction component is the product obtained by epoxidizing an unsaturated alcohol or ester as above specified and in particular relates to those epoxidized animal and vegetable oils which contain no appreciable conjugated unsaturation.

Epoxidizable compounds particularly representative of those indicated herein are unsaturated glycerides, acids and simple or complex esters derived from vegetable, animal, marine and petroleum sources. Some typical vegetable oils with non-conjugated unsaturation are tall oil, peanut, cottonseed, corn, soya bean, safflower, walnut, rapeseed, castor, linseed and perilla. Some typical animal fats are lard and various grades of tallow. Some typical marine oils are menhaden, sardine, cod, pilchard, shark, whale, and sperm oils. Oils and fats from these sources are essentially glycerides, excepting sperm and whale oils which are mixtures of glycerides and ester of mono-hydric long chain alcohols. Tall oil, as isolated, is in the acid form. These oils contain mixtures of esters of saturated and unsaturated fatty acids containing from six to twenty-six carbon atoms per straight chain. The unsaturated acids contain from one to four ethylenic groups. In addition tall oil contains acids with a substituted and partially hydrogenated phenanthrene structure.

For this disclosure, although not limited thereto, glycerol esters serve as a basic source of fatty acids and other esters or products for epoxidation. In the mixture of fatty acids derived from these oils, or the esters themselves, there may be two alternatives: (1) The unsaturated components after separation of saturated compounds; or (2) the mixture can be used without separation of saturated compounds. The latter is usually the preferred method.

Typical unsaturated, non-conjugated fatty acids, having one or more ethylenic groups, are lauroleic, $C_{12}H_{22}O_2$, myristoleic, $C_{14}H_{26}O_2$, palmitoleic, $C_{22}H_{44}O_2$, ricinoleic, $C_{18}H_{34}O_3$, linoleic, $C_{18}H_{32}O_2$, linolenic, $C_{18}H_{30}O_2$, arachidonic, $C_{20}H_{32}O_2$, and clupanodic, $C_{22}H_{36}O_2$. The vegetable, animal and marine oils are typical natural mixed glycerides containing these component acids which can be epoxidized individually or in mixed relationship and in substituted or unsubstituted condition, as desired.

Soybean oil is generally typical of a family of unsaturated non-conjugated compounds containing one or more ethylenic groups which can be epoxidized by the herein disclosed mixture of reactants. Soybean oil is representative of the following general types of epoxidizable glycerol esters; trilinoleate, trioleate, mono-oleate, monolinoleate, monolinolenate, mono-stearate, dilinoleate, dilinoleate, mono-oleate, dioleate monolinoleate, mono-oleate, distearate, and dioleate monostearate.

The mixed fatty acids derived from the natural glycerides may be re-esterified with other polyhydric alcohols such as ethylene glycol, diethylene glycol, mono-, di-, and poly-pentaerythritol, sorbitol and the like. These epoxidized esters are less or more viscous than the corresponding glycerol esters. Viscosity is related to the functionality of the polyol as compared to glycerol. For some end uses viscosity of this origin is desirable.

As indicated, the natural oils or fatty acids may be converted to various types of esters as by alcoholysis or esterification with aliphatic and aromatic saturated and unsaturated, substituted and unsubstituted, mono- and poly-hydric alcohols. The alcohol radicals may also contain one or more epoxidizable ethylenic groups. However, it should be recognized that generally the process relates to epoxidizing unsaturated compounds having ethylenic groups, within the limits defined, irrespective of the substituent group or groups which may also contain an epoxidizable bond also within the limits defined.

The natural glycerides and the derived fatty acids serve as a base raw material for the preparation of mixtures of unsaturated fatty alcohols and esters.

The products from the natural glycerides are essentially straight chain compounds. Thus, the structure of the long chain radicals found in the unsaturated alcohols and esters are essentially identical with those of the starting materials.

Further valuable epoxidizable compounds are defined, may result in other ways which involve the reaction of fat derived compounds with themselves or products of other sources, e.g., petroleum. Thus, fatty acids, alcohols or esters may be dimerized or polymerized with themselves or co-polymerized with other unsaturated reactive compounds. The latter include styrene, its homologues and derivatives, cyclo pentadiene and its derivatives, mono- and poly-unsaturated straight and branched chain olefine, alpha-beta- mono- and di-basic acids including esters, amides, and nitriles. These adducts may be representative of typical copolymer or Diels-Alder adduct compounds.

The products derived from petroleum sources are usually of a branched or cyclic structure. Typical unsaturated compounds useful for epoxidation by the process herein described, are obtained directly from petroleum, or formed during the cracking and reforming operations.

Many other compounds containing ethylenic groups are derived by chemical synthesis, fermentation, and the distillation of oleoresinous mixtures such as gum turpentine.

In the process according to the invention the silicon halide reacts by opening up the epoxide group whereby the halogen attaches itself to one side of the epoxide bridge and the oxygen of the broken epoxide group forms a silicon oxide link with the other side of the bridge. It will be clear therefore that any of the silicon halides including organo-silicon halides which contain at least one reactive halogen will react with an epoxide compound of the type above specified but for practical reasons silicon tetrahalide is the only one coming into consideration and the invention will be further described in connection with the reactions of silicon tetrachloride and the specified epoxy compounds.

In carrying out the invention the silicon tetrachloride may conveniently be added slowly to a solution of the epoxide in a solvent. Suitable solvents are toluene and the chlorinated hydrocarbons, for example, chloroform. The resulting compound is a more or less saturated ester according to the degree of epoxidation of the epoxide reaction component in the said ester and contains silicon in the molecule.

According to the precise way in which the process according to the invention is carried out the oxirane oxygen of the reaction products may be lower than might be expected but this is due to the formation of by-products which, however, are not detrimental either to the reaction products or to their subsequent reaction with polyesters.

A valuable feature of the present invention is the empolyment of the silicon-containing epoxy reaction product as an intermediate. Thus where the silicon-containing reaction product still contains epoxy groups it may be reacted with a drying oil acid to give silicon-containing drying oils for paints, printing inks and synthetic resins, conferring on these final products the valuable property of adhesion to glass.

Another valuable feature of the invention is in the production of polyester resins containing silicon in the molecule. These polyester resins are produced according to the invention by heating the silicon tetrachloride reaction product with an unsaturated polyester whereby polyester resins are produced which contain silicon in the molecule and these resins have a much improved adhesion to glass and consequently provide a very strong bond with glass fibre reinforcements.

As is well-known the unsaturated polyester resins are produced by condensation of an unsaturated dicarboxylic acid with a dihydroxy alcohol. The original unsaturation of the carboxylic acid remains in the condensation polymer. This unsaturation in the condensation polymer may also be increased by employing both an unsaturated acid and an unsaturated alcohol. The unsaturated polyesters may be cross-linked by compatible unsaturated monomers for which purpose styrene is largely used. Other cross-linking agents include other derivatives of benzene, diallyl phthalate and methyl methacrylate.

The unsaturated dicarboxylic acids used are mainly maleic and fumaric acids and useful mixed esters may be obtained by mixing phthalic acid with the unsaturated acid. Phthalic acid itself does not produce any unsaturation capable of double bond polymerization in the mixed ester but its presence with maleic acid increases the compatibility of the polyesterification product with the aromatic cross-linking monomer and provides additional means of varying degree of cross-linking by varying the proportions of the phthalic and unsaturated acids. The degree of cross-linking may also be controlled by varying the amount of the cross-linking agent.

The alcohols used in polyester manufacture are the glycols. Those mainly employed are the ethylene, propylene, diethylene and dipropylene glycols. The use of an unsaturated glycol permits additional cross-linking and therefore produces a more rigid cured resin. The unsaturated glycols however are not readily available.

The following examples illustrate the nature of the invention and how it may be carried into effect.

Example 1

Epoxidized butyl esters of ground-nut oil fatty acids (100 parts, oxirane oxygen content 3.8%) were dissolved in chloroform (500 parts). Silicon tetrachloride (5 parts) was added dropwise over about 10 minutes, and the mixture gently warmed. The chloroform was then distilled off. The silicon-bearing reaction product was a viscous oil, and still contained 1.6% oxirane oxygen.

Example 2

Epoxidized normal octyl alcohol esters of linseed oil fatty acids (100 parts, oxirane oxygen content 5.2%) were dissolved in chloroform (500 parts). Silicon tetrachloride (6.5 parts) was added dropwise over about 10 minutes, and the mixture gently warmed. The chloroform was then distilled off. The silicon-bearing reaction product was a viscous oil, and still contained 1.9% oxirane oxygen.

Example 3

A co-polyester of maleic and phthalic acids with propylene glycol, having an acid value of 86, was prepared. 65 parts of this were allowed to react at 140° C. for 3½ hrs. with 20 parts of the material described in Example 2. Styrene was added to the linear polyester thus produced, and castings were prepared by adding cobalt napthphenate and methyl ethyl ketone peroxide. The procedures for preparing the co-polyester, adding the styrene and casting a sample are well-known, and were performed in commonly understood ways. When the castings were prepared on flat glass plates they were found to adhere very tenaciously to them.

Example 4

Epoxidized soya bean oil (200 parts, oxirane oxygen content 6.6%) where dissolved in chloroform (600 parts) and silicon tetrachloride (11 parts) was added over 30 minutes at room temperature. The reaction was performed by heating the mixture to refluxing point (67° C.) for 2 hours. The solvent was then stripped under vacuum. The product was a yellow viscous oil containing 3.3% of oxirane oxygen.

Example 5

A co-polyester of propylene glycol maleate and phthalate was made by reacting 26.9 parts propylene glycol with phthalic anhydride (25 parts) at 180–190° C. for 75 minutes, adding maleic anhydride (15 parts) and reacting for a further 75 minutes at 180–190° C. The condensate described in Example 4 above (20 parts) was added, and reaction continued for a further 2 hours at 140° C. Styrene was added to the polyester thus produced, and castings were prepared by adding cobalt naphthenate and methyl ethyl ketone peroxide. The procedures for preparing the co-polyester, adding the styrene and casting a sampe are well-known and were performed in commonly understood ways. When the castings were prepared on flat glass plates they were found to adhere very tenaciously to them.

Example 6

Epoxidized normal octyl alcohol esters of linseed oil fatty acids (822 parts, oxirane oxygen content 5.0%) were dissolved in chloroform (2000 parts) and allowed to react with silicon tetrachloride (54.5 parts) at refluxing temperature. The chloroform was then stripped off.

A co-polyester of propylene glycol maleate-phthalate, acid value 63, was prepared by known methods, and the silicon condensate (256 parts) was added to the polyester (1070 parts). The two were heated for 3 hours at 180° C. When the product had cooled to about 90° C. it was dissolved in styrene (544 parts). Promoters and accelerators were added to the solution according to known techniques, and a laminate with heat cleaned glass fibre cloth was prepared. The laminate was fully cured by applying known techniques of post-curing. Strips were cut from the sheets of laminate and broken by bending, in a machine designed to measure the force required. The breaking strength was found to be 55,000 lbs./sq. in., a value which indicates that the laminate was of satisfactory mechanical strength. Satisfactory laminates from polyesters which do not contain silicon in the molecule are only made by precoating the glass fibres with a bonding agent, a step which is not included in the process of this example.

*Example 7*

Silicon tetrachloride (34 parts) was added to epoxidized soya bean oil (oxirane oxygen content 6.16%, 2600 parts) at room temperature with stirring. The temperature was raised to 65° C. and maintained at this value, the stirring being continued for 2 hours. The product was a brownish yellow viscous oil of oxirane oxygen content 3.5%.

This compound, regarded as a polyepoxide, was then made into a drying oil by reaction with a drying oil acid. Linseed oil fatty acids (1170 parts) were added, the temperature raised to 230° C. and maintained at this value for 5¼ hours. The whole of this part of the operation was performed in a current of nitrogen. The product was a brown viscous oil with an oxirane oxygen content of 0.35% and an acidity of 0.09 N. It had drying properties as shown by its ability to form a hard film when mixed with 2% of its weight of a cobalt naphthenate solution containing 3% of cobalt.

The siliconized drying oil so produced has the valuable property of drying on glass to give an adherent film.

The following example illustrates the employment of an epoxidized oil in which some of the epoxy groups have been previously esterified.

*Example 8*

Epoxidized soya bean oil (2600 parts, oxirane oxygen content 6.16%) was reacted with linseed oil fatty acids (1,400 parts) in an atmosphere of nitrogen at 250° C. for 2 hours. In this way a large proportion of the oxirane groups were esterified. There remained 0.5% of oxirane oxygen. This epoxide was then reacted with silicon tetrachloride (53 parts) by mixing the two at room temperature and heating them to 65° C. for 2 hours. The siliconized drying oil produced had an oxirane oxygen content of 0.04%, and possessed the valuable property of forming a dried film which adhered to glass when mixed with cobalt driers and spread on the glass.

I claim:

1. A process for producing long chain aliphatic compounds containing oxirane groups and silicon halide connected to the aliphatic chain through a broken epoxide bridge with the oxygen of the broken epoxide group forming a silicon oxide linkage with the aliphatic chain and halogen attached to the other side of the said bridge, comprising the steps of mixing silicon tetrachloride with epoxidized material selected from the group consisting of fatty acids, fatty esters, fatty alcohols, and mixtures of the same, containing 6 to 26 carbon atoms in the fatty chain portion, and having before epoxidation an iodine value of at least about 80 and from 1 to 4 non-conjugated ethylenic groups and after epoxidation containing epoxide groups across the bridges of said ethylenic groups, warming the mixture to effect a reaction between said epoxy groups and said silicon tetrahalide thereby forming said new long chain organic compound containing silicon in the molecule.

2. The process as set forth in claim 1 in which the epoxidized fatty compound comprises epoxidized esters of long chain fatty acids.

3. The process of claim 1 wherein, the mixture is dissolved in a mutual solvent and is heated to the solvent refluxing temperature while effecting the production of said oxirane and silicon containing compound.

4. The product produced by the process of claim 1.

5. The process of claim 1 including the additional steps of mixing the silicon-containing long chain product with an unsaturated polyester material comprising a reaction product of an unsaturated dicarboxylic acid and a polyhydric alcohol, heating the mixture and effecting an intermolecular reaction chemically combining said polyester and said silicon product.

6. The process as set forth in claim 5 in which the polyester material comprises a maleic-phthalic acid mixed ester.

7. The product produced by the process of claim 5.

8. The process of claim 5 including the additional steps of dissolving the silicon reaction product in a compatible cross-linking unsaturated monomer containing a polymerizable ethylenic group, adding an accelerator and effecting a copolymerization of said silicon reaction product with said monomer.

9. The process as set forth in claim 8 in which the compatible monomer is styrene.

10. The product produced by the process of claim 8.

References Cited in the file of this patent

UNITED STATES PATENTS

| | | |
|---|---|---|
| 2,048,799 | Lawson | July 28, 1936 |
| 2,650,934 | Rust et al. | Sept. 1, 1953 |
| 2,687,398 | McLean | Aug. 24, 1954 |
| 2,819,245 | Shorr | Jan. 7, 1958 |
| 2,843,560 | Mika | July 15, 1958 |
| 2,884,388 | Hedlund | Apr. 28, 1959 |
| 2,895,929 | Yusem | July 21, 1959 |
| 2,895,930 | Yusem | July 21, 1959 |
| 2,970,969 | Shultz et al. | Feb. 7, 1961 |